US011455391B2

(12) United States Patent
Gkoulalas-Divanis et al.

(10) Patent No.: US 11,455,391 B2
(45) Date of Patent: Sep. 27, 2022

(54) DATA LEAKAGE AND MISUSE DETECTION

(71) Applicant: International Business Machines Corporation, Armonk, NY (US)

(72) Inventors: Aris Gkoulalas-Divanis, Waltham, MA (US); Paul R. Bastide, Ashland, MA (US); Rohit Ranchal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/082,149

(22) Filed: Oct. 28, 2020

(65) Prior Publication Data
US 2022/0129548 A1    Apr. 28, 2022

(51) Int. Cl.
| G06F 21/00 | (2013.01) |
| G06F 21/55 | (2013.01) |
| G06K 9/62 | (2022.01) |
| H04L 9/32 | (2006.01) |
| H04L 9/06 | (2006.01) |
| G06F 21/60 | (2013.01) |

(52) U.S. Cl.
CPC .......... *G06F 21/556* (2013.01); *G06F 21/602* (2013.01); *G06K 9/6215* (2013.01); *H04L 9/0618* (2013.01); *H04L 9/0643* (2013.01); *H04L 9/3247* (2013.01)

(58) Field of Classification Search
None
See application file for complete search history.

(56) References Cited

U.S. PATENT DOCUMENTS 6,718,336 B1    4/2004    Saffer et al.
7,539,877 B2    5/2009    Miyata et al.
(Continued)

FOREIGN PATENT DOCUMENTS

| CN | 112241666 A | * | 1/2021 |
| KR | 101030138 B1 | | 4/2011 |
| WO | 2018222202 A1 | | 12/2018 |

OTHER PUBLICATIONS

Mokbel et al., "The New Casper: Query Processing for Location Services without Compromising Privacy," VLDB '06: Proceedings of the 32nd International Conference on Very Large Data Bases, Sep. 2006, pp. 763-774, ACM.
(Continued)

*Primary Examiner* — Andrew J Steinle
(74) *Attorney, Agent, or Firm* — Mark Bergner (57) ABSTRACT

A computer-implemented system and method for a data leakage and misuse detection system comprises receiving an evaluation dataset A, and building a signature of the evaluation dataset A (sig(A)), where A signature of a dataset is a multi-level evaluation data abstraction representation of the dataset. The method further comprises building a signature for each of existing datasets B (B1, B2, . . . , Bn) (sig($B_x$)) that are stored in a memory. The method then compares the sig(A) with each of the sig($B_x$)s. A similarity score is derived based on the comparing, and responsive to determining the similarity score exceeds a predefined threshold, the method comprises generating an activity related to the determination.

18 Claims, 6 Drawing Sheets

(56) References Cited

U.S. PATENT DOCUMENTS

| | | | |
|---|---|---|---|
| 7,937,579 B2 | 5/2011 | Peckover | |
| 9,473,307 B2 | 10/2016 | Seo et al. | |
| 9,960,920 B2 | 5/2018 | Cuende et al. | |
| 2006/0173787 A1 | 8/2006 | Weber et al. | |
| 2010/0306204 A1* | 12/2010 | Chitiveli | G06F 16/353 707/753 |
| 2011/0239306 A1 | 9/2011 | Avni et al. | |
| 2014/0165137 A1 | 6/2014 | Balinsky et al. | |
| 2018/0012003 A1* | 1/2018 | Asulin | G06F 21/36 |

OTHER PUBLICATIONS

Mell, P et al., "The NIST Definition of Cloud Computing", Recommendations of the National Institute of Standards and Technology, NIST Special Publication 800-145, 7 pages, Sep. 2011.

\* cited by examiner

DATA LEAKAGE AND MISUSE DETECTION

BACKGROUND

Disclosed herein is a system and related method for detecting data leakage and misuse. Data theft is a problem that has become more prominent as information has become easier to store and move. Increasingly, data storage and cloud service providers are being asked to take a more active role in determining when such data theft has occurred. One example is a cloud platform that aims to collect datasets from a number of companies for storage and data analytic purposes. When a new dataset is uploaded to a system, the system administrator may wish to verify that it is an original dataset and not one that contains leaked or stolen data. To this end, only original datasets should be accepted by the system/platform. Given the many incidents of data theft that are reported in the media, it is not uncommon for stolen data to be presented for storage to the platform, or be part of datasets uploaded to the platform. Such stolen data may constitute stolen trade secret data, copyrighted data, other forms of intellectual property, and/or classified information. Bad actors who use leaked data may unfairly get an advantage over their competitors.

SUMMARY

According to one aspect disclosed herein, a computer-implemented method is provided comprising, using a processor for receiving an evaluation dataset A, and building a signature of the evaluation dataset A (sig(A)), where A signature of a dataset is a multi-level evaluation data abstraction representation of the dataset. The method further comprises building a signature for each of existing datasets B (B1, B2, . . . , Bn) (sig($B_x$)) that are stored in a memory. The method then compares the sig(A) with each of the sig($B_x$)s. A similarity score is derived based on the comparing, and responsive to determining the similarity score exceeds a predefined threshold, the method comprises generating an activity related to the determination.

According to another aspect disclosed herein, a data detection system, comprises a processor configured to receive an evaluation dataset A, and build a signature of the evaluation dataset A (sig(A)). The signature of a dataset is a multi-level evaluation data abstraction representation of the dataset. The processor is further configured to build a signature for each of existing datasets B (B1, B2, . . . , Bn) (sig(Bx)) that are stored in a memory, and compare the sig(A) with each of the sig(Bx)s. A similarity score is determined based on the comparing, and responsive to determining the similarity score exceeds a predefined threshold, generate an activity related to the determination.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Overview of the Data Leakage and Misuse Detection System

A data leakage and misuse detection system is disclosed herein that permits detection of copied data at different levels of granularity. This system assembles data sets in an ordered fashion such that a granular lineage and identity of the data can be determined. If a newly submitted data set is copied, the system is capable of determining that it was derived from prior data sets of data. This system is able to work with disorganized data to generate a set of hashes such that the relationships are ordered in columnar data or unstructured data in order to determine for each hash a related hash in a consistent and effective way. A specific organization of the data elements within the data sets is created so that the data sets can be more consistently compared.

The following acronyms may be used below:
API application program interface
ARM advanced RISC machine
CD-ROM compact disc ROM
CID cell (or area, or block) identifier
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider ISA instruction-set-architecture
LAN local-area network
LDSG level, digest, signature generator
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
UID user ID
VM virtual machine
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
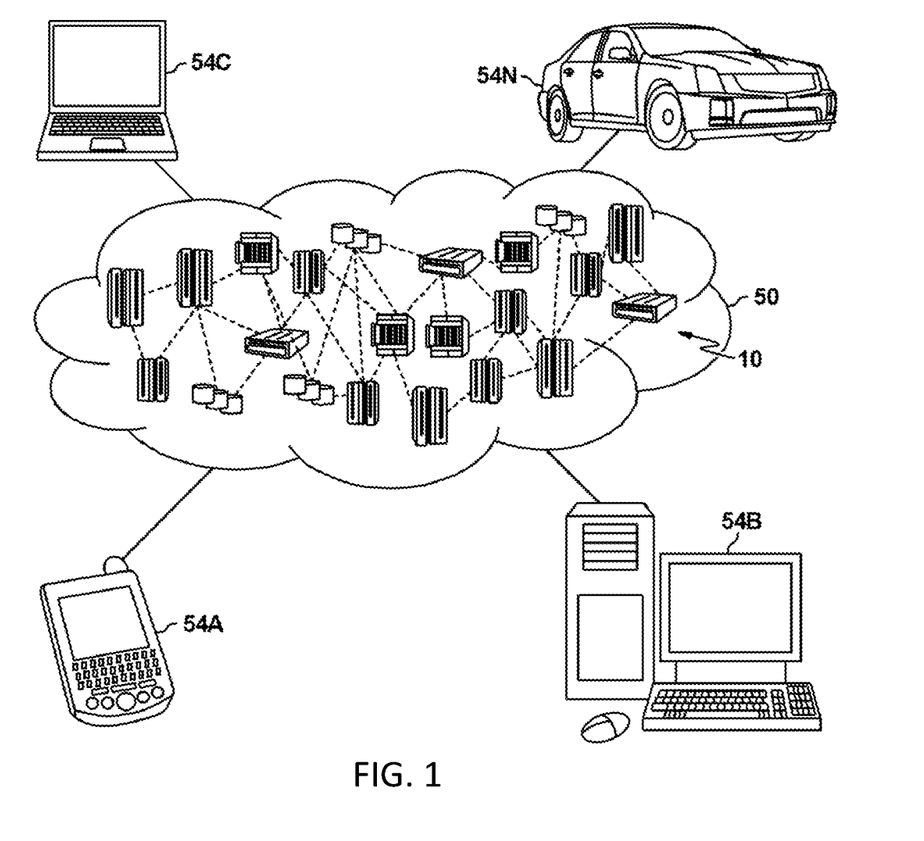
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
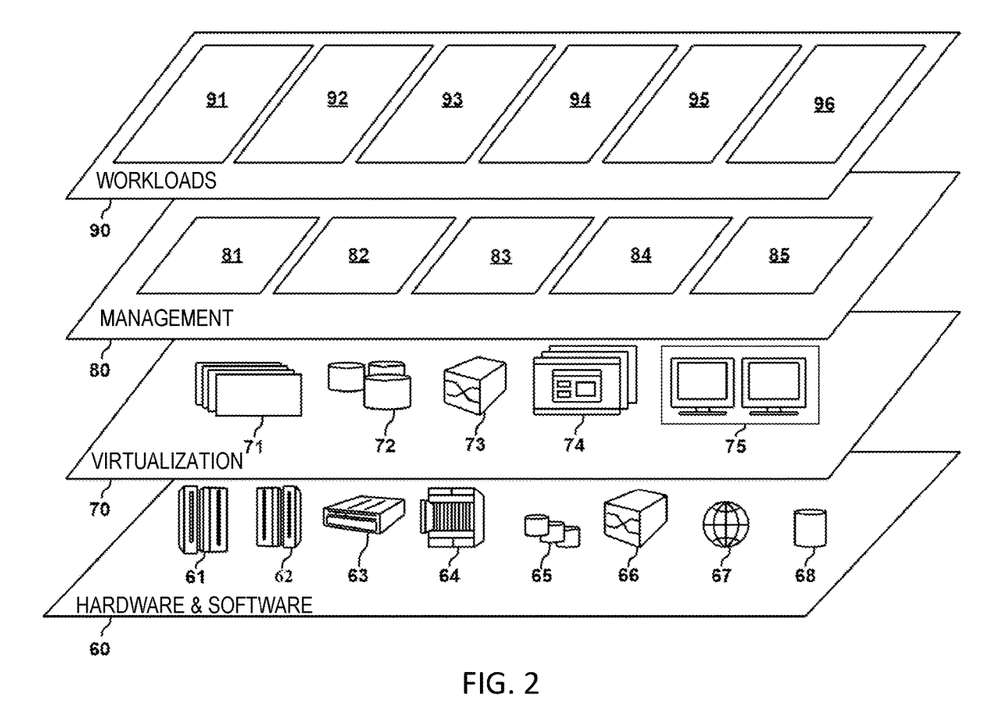
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
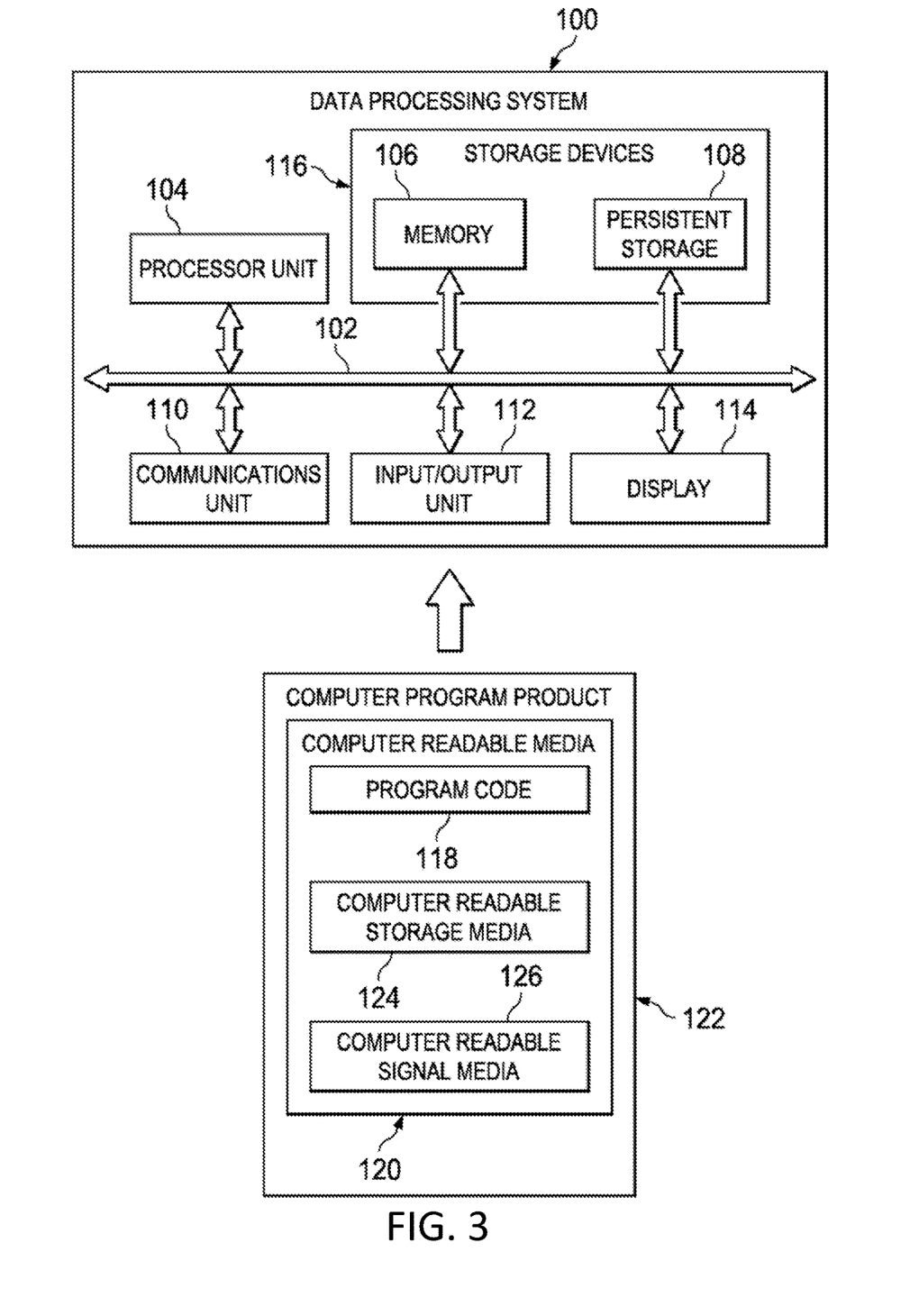
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100.

Misuse Detection of Leaked Data

In order to detect potential leaked data and its misuse, a system and related method scan a new data set that a user may wish to upload into the storage system, such as a cloud platform, to determine/identify if the new data set is similar and/or shares commonalities with other data sets that might be stored on the system to thereby identify potential leaked/stolen data.

Using the technical techniques disclosed herein, the proposed method/system is able to efficiently identify commonalities between the datasets that are already uploaded to the system and the new dataset that a user submits for upload. The system may also be able to report and/or take any other action with respect to any such similarities found with existing datasets, in order to, e.g., prove a data leak.

Figure 4:
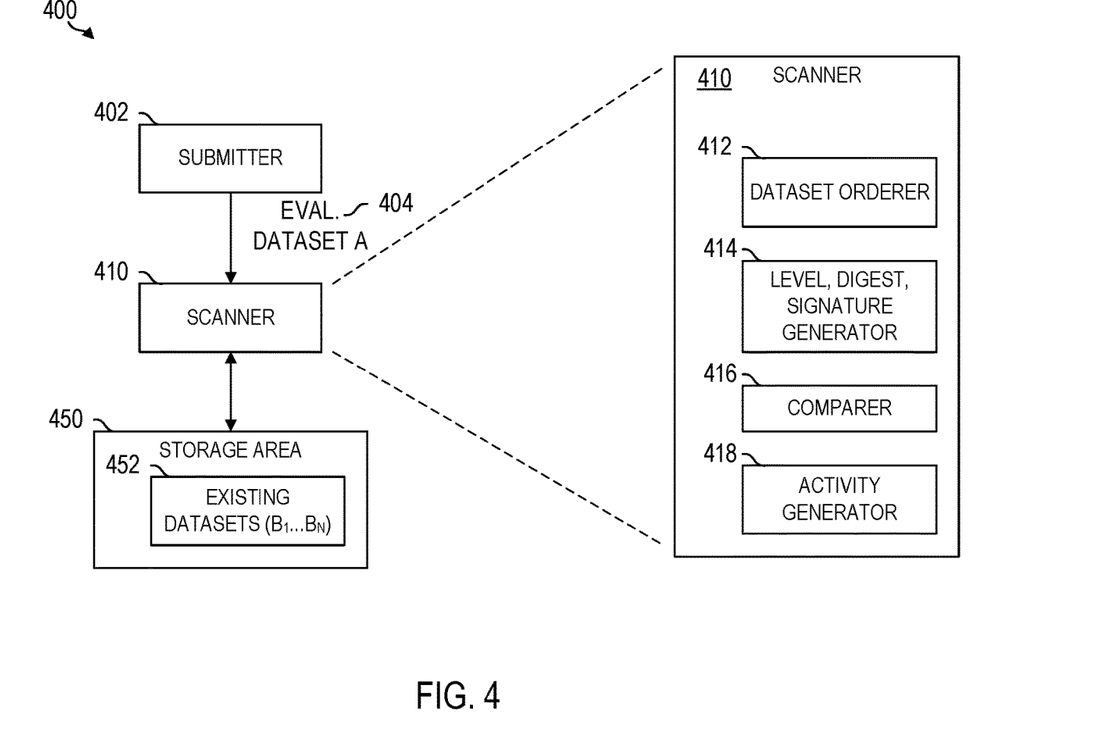
FIG. 4 is a block diagram showing an example of a system that may be used for the detection, according to some implementations.

FIG. 4 is a block diagram showing an example of a system 400 that may be used for the detection. A submitter 402 attempts to upload a new dataset, also referred to herein as an evaluation dataset A 404 into a storage area 450 of the system 400. The system 400 (which does not include the submitter 402) may, for example, run in a cloud computing environment on a cloud computing node 10. A scanner 410 may run on a DPS 100, and the storage area 450 may be provided on a same DPS 100 or different DPS 100. The storage area 450 contains a plurality of existing datasets $B_1 \ldots B_N$ 452. The scanner 410 finds common content that exists between evaluation dataset A 404 and existing datasets $B_1 \ldots B_N$ 452, and determines an aggregate score corresponding to the similarity of evaluation dataset A 404 to each of the existing datasets $B_1 \ldots B_N$. If the aggregate score of relatedness/similarity to an existing dataset ($B_x$) exceeds a threshold, then, according to some embodiments, the scanner may determine that the evaluation dataset A 404 contains leaked data or data theft, and may, in some embodiments, take a suitable action based on this determination.

The scanner 410 may, according to some embodiments, detect data leakage/theft by performing the following operations.

First, the scanner 410 builds a multi-level abstraction, called a signature($B_i$) (500, FIG. 5), for each existing dataset $B_1 \ldots B_N$ 452 that is stored in the storage area 450. Next, using the signature($B_i$) abstractions, the scanner 410 computes a threshold similarity score, thr(B), corresponding to the maximum similarity of an existing dataset ($B_i$) 452 to another existing dataset ($B_j$) 452. This threshold similarity score thr(B) may be used to differentiate a small number of commonalities between datasets that may occur simply by chance from the case of leaked/stolen data. Next, the scanner 410 creates signature(A), which is the multi-level abstraction 500 of evaluation dataset A 404. The scanner 410 then compares signature(A) with each signature($B_i$) for datasets $B_1 \ldots B_N$ 452 that are stored in the storage area 450. From this, the scanner 410 derives an overall similarity score, score(A), for the evaluation dataset A 404, computed as the aggregate similarity of evaluation dataset A 404 with datasets $B_1 \ldots B_N$ 452 of the system 400. This may be computed as a simple sum, a weighted sum, or in some other similar manner. Finally, the scanner 410 compares score(A) against thr(B) and reports (and/or performs some other activity regarding) evaluation dataset A 402 as containing leaked/stolen data if score(A)>thr(B).

The multi-level abstraction of a dataset operates as an index to a list of data summaries obtained at different levels of granularity. Some embodiments may use a pyramid-like structure or quad-trees in order to compute the multi-level abstractions, and the use of MD5 or another message digest function to derive a summary from the contents in selected cells of a dataset. The system described herein may also be used to detect data modifications, as these will impact the computed message digests (values of the hash functions).

The following discussion breaks down the steps described above into more detail, according to some embodiments. The following consider that all datasets 404, 452 in the platform are represented under a common/unified schema of data columns.

Step 1: Computing a Signature of a Dataset

Figure 5:
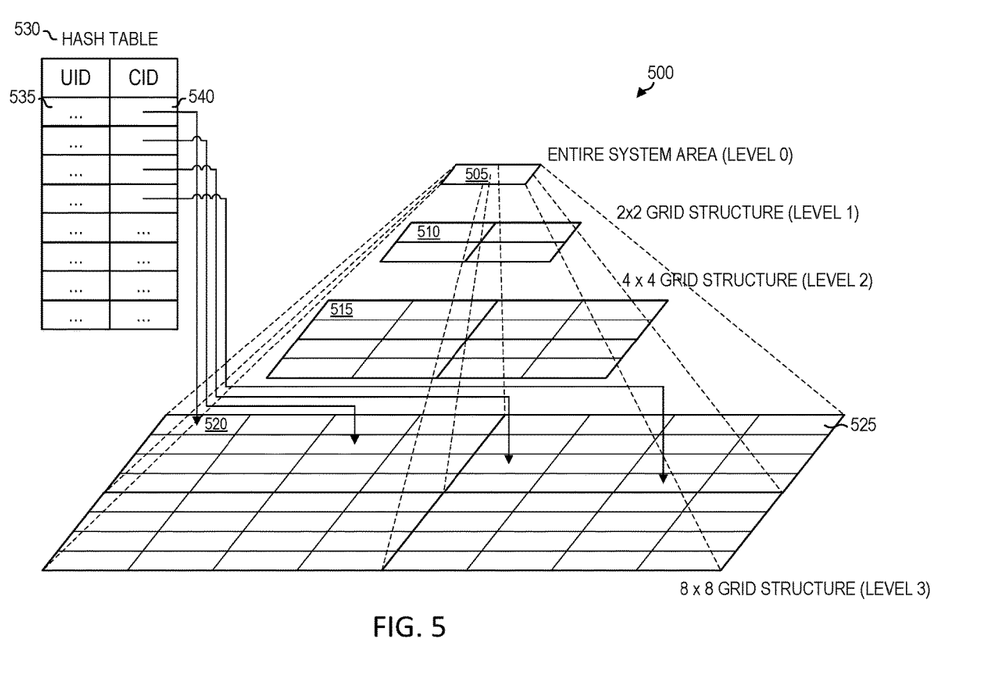
FIG. 5 is a pictorial illustration of a signature of a dataset, according to some embodiments.

FIG. 5 is a pictorial illustration of a signature 500 of a dataset 404, 452, according to some embodiments. The signature 500 of a dataset 404, 452 corresponds to a multi-level abstraction data structure, potentially like the one shown in FIG. 5 (or, in some other embodiments, it can be a quad-tree, an R-tree, etc.). To compute the signature 500 of a dataset, 404, 452 the scanner 410, in a first step, initially uses a dataset orderer 412 to apply ordering logic. In some implementations, the ordering logic ensures that columns of the dataset 404, 452 appear in a pre-determined order (e.g., lexicographical). Similarly, in some embodiments, the dataset orderer 412 ensures that rows of the dataset 404, 452 appear in a pre-determined order (e.g., numerical, lexicographical, or based on a key attribute (which is an attribute that has a unique value for each record in the data)). The dataset orderer 412 may identify column names in the set, and order the data in a common format. The dataset orderer 412 may then generate, from the subset, the hash or digest of the block in each set based on the column names using a hash algorithm, such as sha256sum md5sum, or other summed sets. This order is ideally common to all datasets 404, 452 so that content similarities can be more effectively discovered.

From the ordered data, a pyramid structure top-down may be built by a level, digest, signature generator (LDSG) 414 of the scanner 410. This may be done by first computing a digest, using algorithms such as MD5, SHA-1, SHA-2, and the like, of the entire dataset 404, 452, which corresponds to the top cell-entire system area (level 0) 505. The LDSG 414 then logically splits the dataset 404, 452, e.g., into quadrants (row-wise and column-wise), and computes/stores the digest of each quadrant. The same process repeats in a recursive way until individual cells are reached in the data, for which again the digests are computed and stored. As shown in FIG. 5, such a breakdown and iteration comprises four levels: the entire system area (level 0) 505, a 2×2 grid structure (level 1) 510, a 4×4 grid structure (level 2) 515, and an 8×8 grid structure (level 3) 520. However, the number of levels on a given real-life dataset is likely to be greater. The grid structure is shown as each layer being broken into one or more blocks 525. For a given dataset, in some embodiments, the block may be broken down into x, y coordinates within a level, so that for a given dataset, the block may be defined as $b_{l_{x,y}}$, where l stands for the level, x is the x-coordinate of the block, and y is the y-coordinate of the block.

A hash table 530 contains a globally unique identifier UID 535, and a cell, area, or block (as described above) identifier CID 540 for each of the cells, along with the computed message digests/hashes of the cells at each particular grid structure level. The entire structure 505-520 along with the related hash table 530 is referred to herein as a signature 500, and is created for each dataset $B_1 \ldots B_N$ 452. The signatures are stored in the system 400. In some embodiments, once this step has been performed, access to the datasets $B_1 \ldots B_N$ 452 may no longer be needed-only their signatures 500 (although in some embodiments, some of the reporting may view a limited subset of the datasets, e.g., column and column headers). This may allow some parts of the scanner 410 to execute in a privileged manner to access the actual data, while the remaining parts of the scanner 410 do not require privilege since once the signatures are determined, no actual data need be revealed. A signature 500 on a particular dataset $B_x$ 452 does not need to be recalculated if its underlying data has not changed, and thus the dataset $B_x$ may utilize a flag (not shown) that indicates the need for the signature 500 to be recalculated.

Step 2: Computing Similarity and the Similarity Threshold Using Signatures

In a second step, a similarity baseline is calculated constituting a maximum expected level of similarity between datasets $B_1 \ldots B_N$ 452 that are already stored in the system. This similarity baseline is then used in subsequent data comparisons. Considering that the existing datasets $B_1 \ldots B_N$ 452 that are already stored in the system 400 are all original (i.e., do not contain copied data), their maximum similarity corresponds to an acceptable level of similarity that will be tolerated when considering the new evaluation dataset A. Any comparison of a new evaluation dataset A against any of the existing datasets $B_1 \ldots B_N$ 452 that leads to a higher level of similarity than this similarity baseline may be marked as a potential case of a data leak. This is conceptually similar to the fact that two different authors are likely to use the same words and phrases in two different books, but as one considers the higher level structures, such as sentences, paragraphs, pages, and chapters, the likelihood that they are identical by chance diminishes as the structural complexity is higher.

To compute the similarity between two datasets $B_1$ and $B_2$, denoted as similarity($B_1$, $B_2$), a comparer 416 of the scanner 410 use the signatures 500 of the two datasets $B_1$, $B_2$, and calculates their common blocks. This computation can be done efficiently by visiting the two pyramids in a top-down fashion and finding their common blocks (common blocks being those corresponding to the same digests). When a common block is found, then, by construction, no further examination of smaller regions of this block is needed, since the digests of the smaller regions would be the same as well. In some embodiments, a similarity score may be provided as a ratio in terms of common cells over total cells can be derived to express the similarity of the two datasets—such a ratio would have a value between 0 and 1. This may be done for each level, since similar cells at higher levels constitute a much greater indication of copying than similar cells at a lower level. Higher level cells may be weighted more since higher levels cells having the same digest values is more indicative of copying. For example, in the quadrant split, each level's block may be weighted four times the weight of an immediate lower level block.

Repeating the above-described process for each pair of the existing datasets ($B_i$, $B_j$) 452 stored in the platform, the maximum similarity ($B_i$, $B_j$) may be derived and used as the threshold thr(B). This process of establishing the threshold need not be performed each time a new dataset A is received—rather it could be performed on a periodic basis, in response to a certain number of new datasets received, in response to a particular amount of data that has changed in the storage area 450, in response to a user request, etc.

Step 3: Computing the Overall Similarity Score for a New Dataset

In a third step, an overall similarity score, score(A), for the evaluation dataset A 404, may be computed by the comparer 416 as the aggregate similarity of the evaluation dataset A 404 with the datasets $B_1 \ldots B_N$ 452 of the platform. First, the comparer 416 computes the similarity of the evaluation dataset A 404 against each of the datasets $B_1 \ldots B_N$ 452. Two cases may be considered: (a) find the dataset $B_j$ 452 that is most similar to evaluation dataset A 404, in which case score(A)=max(similarity(A, $B_j$)); or (b) compute the average similarity of evaluation dataset A 404 to all datasets $B_i$ 452. In the latter case, it is possible to catch situations where evaluation dataset A 404 comprises information leaked by many datasets, where each leakage is not in itself significant enough to be reported as a data leak, but collectively, the leakage may be significant. For example, evaluation dataset A 404 may be one in which each record was taken from a different dataset $B_1 \ldots B_N$ 452.

After computing a similarity score(A), the comparer 416 compares this to the threshold thr(B). If the similarity score(A) is above the threshold thr(B), then this constitutes a determination that a data leak has occurred, and an activity generator 418 triggers an activity, such as an alert action. This alert action may be, e.g., providing a report to a display device of a manager of the system 400. The larger the difference between the similarity score(A) and the threshold thr(B), the higher the confidence that evaluation dataset A 404 represents a data leak and/or the more significant the data leak. In some embodiments, the activity generator 418 may, upon determining a potential data leak exists, transform a suspected leaked data set into an intermediary or preferred data format, and select a candidate misuse of the leaked data set {C,D,A} (an unordered subset of the columns) in the preferred data format. For example, the preferred data format may be a text representation of the common data (or some subset thereof).

The alert action may constitute one or more of the following: a) blocking the population of the evaluation dataset A 404 into the storage area 452, b) contacting an address, person, IP Address, or other identification of and entity associated with one or more of the existing datasets $B_x$ or the evaluation dataset, c) contacting the authorities with a takedown request, d) isolating an associated shard or virtual machine (VM), e) moving the data sets that do not contain copied data onto alternative storage, f) scheduling media, such as a data disk, comprising the copied data to be shredded post investigation, and g) removing all access to the (suspect) copied data until an investigation completes.

Figure 6:
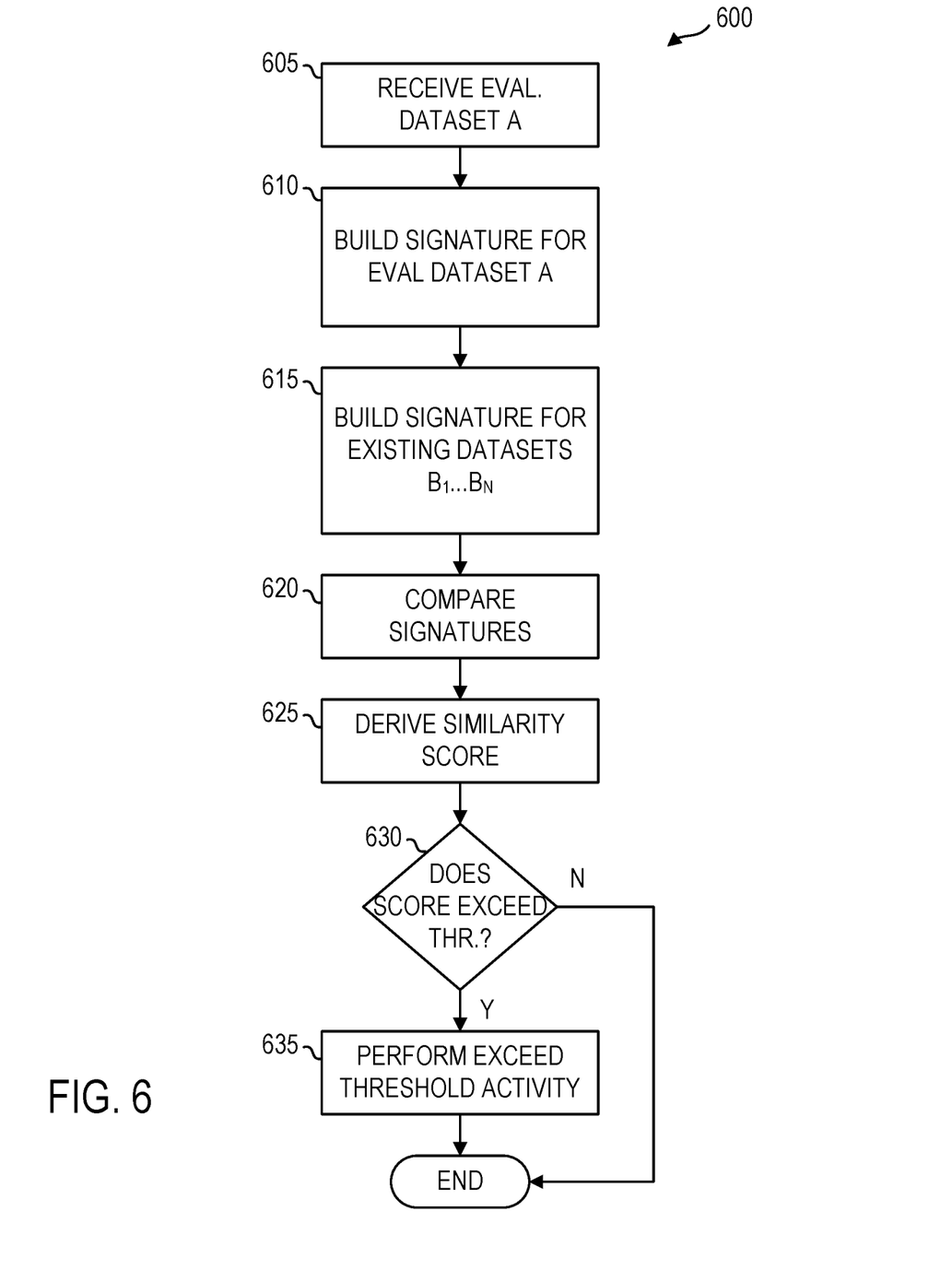
FIG. 6 is a flowchart illustrating a process that may be used for the detection, according to some embodiments.

FIG. 6 is a flowchart illustrating a process 600 that may be used, according to some embodiments, to determine potential data theft. In operation 605, the scanner 410 may receive an evaluation dataset A 404 from the submitter 402, via, e.g., the communications unit 110. In operation 610, the LDSG 414 may build a signature 500 from the evaluation dataset A 404 using, e.g., the techniques described above. In operation 615, the LDSG 414 may build a signature 500 for any of the existing datasets $B_1 \ldots B_N$ 452 that do not have an existing and current signature 500. The signature 500 may contain the digest/hash values for the blocks of data at a plurality of levels, as described above, e.g.

In operation 620, the comparer 416 compares the signature 500 of the evaluation dataset A 404 to each of the existing datasets $B_1 \ldots B_N$ 452 by, e.g., looking for a same digest value for corresponding blocks. In operation 625, a similarity score may be determined by the comparer 416, and, in operation 630, if the similarity score meets or exceeds some threshold thr(B) value (630: Y) (the threshold thr(B) having been determined e.g., based on comparing other existing datasets $B_1 \ldots B_N$ 452), then the activity generator 418 takes an action as described above responsive to this evidence of copying. If the similarity score does not meet the threshold thr(B) (630: N) then this process ends and the evaluation dataset A 404 may be normally processed by the system 400.

Technical Application

The one or more embodiments disclosed herein accordingly provide an improvement to computer technology. For example, an improvement to detecting data leaks and improper copying improves the security of shared network storage. The ability to provide users with notification of such data leaks may avert potential damage caused by a security breach.

Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying copied data comprising using a processor for:
   receiving an evaluation dataset A;
   building a signature of the evaluation dataset A (sig(A)), wherein the signature of a dataset is a multi-level evaluation data abstraction representation of the dataset;
   building a signature for each of existing datasets B (B1, B2, . . . , Bn) (sig($B_x$)) that are stored in a memory;
   comparing the sig(A) with each of the sig($B_x$)s;
   deriving a similarity score based on the comparing; and
   responsive to determining the similarity score exceeds a predefined threshold, generating an activity related to the determination;
   wherein the deriving of the similarity score comprises:
      creating levels of respective signatures for each of the datasets by creating a single block at a highest level that represents the entire dataset and recursively splitting each block into a plurality of blocks at a lower level that represent portions of the dataset until individual cells are reached in the data:
      determining one or more blocks at each level for the sig(a) and the sig($B_x$)s and calculating a digest value for each of the determined blocks;
      for each of the sig($B_x$)s, performing a block comparing of the digest value for each block to a digest value in a corresponding block of the sig(a) to determine when the digest values match; and
      computing the similarity score based on a number of the block compares that match.

2. The method of claim 1, wherein the computing of the similarity score incorporates a ratio of block compares that match to a total number of blocks.

3. The method of claim 2, wherein the computing of the similarity score further incorporates a block weighting that is dependent upon a level in which the block resides.

4. The method of claim 1, wherein the splitting of each block is a quadrature split that divides each block into four separate blocks at a lower level.

5. The method of claim 1, wherein no splitting of a particular block takes place conditioned upon the digest of the particular block being equal to a corresponding block in a dataset under comparison.

6. The method of claim 1, wherein the digest value is calculated based on an algorithm selected from the group consisting of MD5, SHA-1, and SHA-2.

7. The method of claim 1, wherein the predefined threshold is based on information contained within the existing datasets B (B1, B2, . . . , Bn).

8. The method of claim 7, wherein the predefined threshold is calculated by calculating a plurality of similarity scores between each of the existing datasets B (B1, B2, . . . , Bn) and choosing the predefined threshold as a maximum value of the plurality of similarity scores.

9. The method of claim 1, further comprising, prior to the building of the signature for each said dataset:
   ordering the evaluation dataset A and each of the existing datasets B (B1, B2, . . . , Bn) according to a common ordering logic.

10. The method of claim 9, wherein the ordering logic orders each said dataset by row and column.

11. The method of claim 9, wherein the ordering logic orders each said dataset by a factor selected from the group consisting of numerical, lexicographical, and a key attribute of the dataset.

12. The method of claim 1, wherein the activity is selected from the group consisting of reporting a data leak to an administrator, blocking the population of the evaluation dataset A into the memory, contacting an address, person, IP Address, or other identification of an entity associated with one or more of the existing datasets $B_x$ or the evaluation dataset A, contacting authorities with a takedown request, isolating an associated shard or virtual machine (VM), moving the datasets that do not contain copied data onto alternative storage, scheduling a media containing the copied data to be shredded post investigation, and removing all access to the copied data until an investigation completes.

13. A data detection system, comprising:
   a hardware processor configured to:
   receive an evaluation dataset A;
   build a signature of the evaluation dataset A (sig(A)), wherein the signature of a dataset is a multi-level evaluation data abstraction representation of the dataset;
   build a signature for each of existing datasets B (B1, B2, . . . , Bn) (sig(Bx)) that are stored in a memory;
   compare the sig(A) with each of the sig(Bx)s;
   derive a similarity score based on the comparing; and
   responsive to determining the similarity score exceeds a predefined threshold, generate an activity related to the determination;
   wherein the derivation of the similarity score comprises the processor being configured to:
      create levels of respective signatures for each of the datasets by creating a single block at a highest level that represents the entire dataset and splitting each block into a plurality of blocks at a lower level that represent portions of the dataset;

determine one or more blocks at each level for the sig(a) and the $sig(B_x)$s and calculating a digest value for each of the determined blocks;

for each of the $sig(B_x)$s, perform a block comparing of the digest value for each block to a digest value in a corresponding block of the sig(a) to determine when the digest values match; and compute the similarity score based on a number of the block compares that match.

14. The system of claim 13, wherein the processor is further configured to:

order the evaluation dataset A and each of the existing datasets B (B1, B2, ..., Bn) according to a common ordering logic.

15. The system of claim 13, wherein the activity is selected from the group consisting of reporting a data leak to an administrator, blocking the population of the evaluation dataset A into the memory, contacting an address, person, IP Address, or other identification of an entity associated with one or more of the existing datasets $B_x$ or the evaluation dataset A, contacting authorities with a takedown request, isolating an associated shard or virtual machine (VM), moving the datasets that do not contain copied data onto alternative storage, scheduling a media containing the copied data to be shredded post investigation, and removing all access to the copied data until an investigation completes.

16. A method for identifying copied data comprising using a processor for:

receiving an evaluation dataset A;

building a signature of the evaluation dataset A (sig(A)), wherein the signature of a dataset is a multi-level evaluation data abstraction representation of the dataset;

building a signature for each of existing datasets B (B1, B2, ..., Bn) ($sig(B_x)$) that are stored in a memory;

comparing the sig(A) with each of the $sig(B_x)$s;

deriving a similarity score based on the comparing; and responsive to determining the similarity score exceeds a predefined threshold, generating an activity related to the determination;

wherein:

the deriving of the similarity score comprises:

creating levels of respective signatures for each of the datasets by creating a single block at a highest level that represents the entire dataset and splitting each block into a plurality of blocks at a lower level that represent portions of the dataset;

determining one or more blocks at each level for the sig(a) and the $sig(B_x)$s and calculating a digest value for each of the determined blocks;

for each of the $sig(B_x)$s, performing a block comparing of the digest value for each block to a digest value in a corresponding block of the sig(a) to determine when the digest values match; and computing the similarity score based on a number of the block compares that match; and no splitting of a particular block takes place conditioned upon the digest of the particular block being equal to a corresponding block in a dataset under comparison.

17. The method of claim 16, wherein the digest value is calculated based on an algorithm selected from the group consisting of MD5, SHA-1, and SHA-2.

18. The method of claim 1, wherein the predefined threshold is based on information contained within the existing datasets B (B1, B2, ..., Bn).

* * * * *